No. 888,401. PATENTED MAY 19, 1908.
G. A. HOLMES.
SNAP FASTENER.
APPLICATION FILED AUG. 12, 1905.

WITNESSES:
Frank G. Parker
L. M. McKil

INVENTOR:
George A Holmes
by Donald Campbell
his Attorney

UNITED STATES PATENT OFFICE.

GEORGE A. HOLMES, OF NEWTON CENTER, MASSACHUSETTS.

SNAP-FASTENER.

No. 888,401.     Specification of Letters Patent.     Patented May 19, 1908.

Application filed August 12, 1905. Serial No. 273,889.

*To all whom it may concern:*

Be it known that I, GEORGE A. HOLMES, a citizen of the United States, and resident of Newton Center, Massachusetts, have invented a new and useful Improvement in Snap-Fasteners, of which the following, taken in connection with the accompanying drawings, is a specification.

My invention relates to snap fasteners such as are often used for separably attaching two articles or two portions of an article, such as a glove.

My invention relates more particularly to that portion of the snap fastener which is now well known as the stud or ball; and my invention is shown as embodied in a form of ball or stud which, from its appearance, has heretofore been termed a "bird cage" stud.

My invention consists in a novel manner of assembling the parts of such a stud and in novel conformations of such parts and in the combinations thereof as set forth in the claim appended hereto.

An object of my invention is to simplify the manufacture of studs such, for example, as are known as bird cage studs by so forming and combining the parts in the novel manner hereinafter described as to dispense with any interior or other specially provided device for preventing radial movement or collapse of those portions of the arms of the bird cage which lie in proximity to the narrowest portion or "groove" of the stud below the widest portion or "bulge" thereof.

To this object my invention consists substantially in providing in a snap fastener stud member which comprises a spring head having the spring arms thereof turned outwardly at the bottom or near the contracted portion or groove, a peculiar and novel conformation of the said spring arms, and in combining therewith an attaching eyelet so related thereto as to constitute a preventive against collapse of the spring arms, the eyelet being clenched through the material.

I will first describe snap fasteners embodying my invention and then point out the novel features in the claims.

Figure 1:
Figure 3:
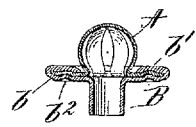
Figure 2:
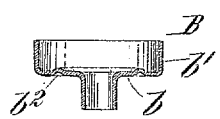
Figure 4:
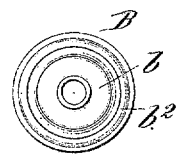
Figure 5:
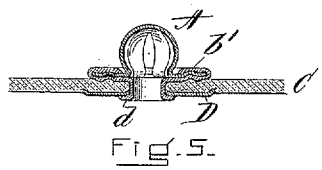
Figure 6:
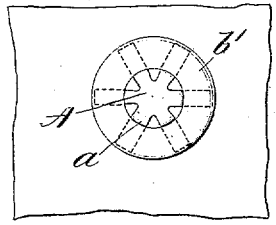

Figure 1 is a vertical sectional view of the spring head portion of a snap fastener stud member embodying my invention; Fig. 2 is a similar view of a flanged attaching eyelet adapted to coöperate with the spring head of Fig. 1 when the two are in proper engagement; Fig. 3 shows the spring head and the eyelet of Figs. 1 and 2 attached to each other; Fig. 4 is a bottom view of the assembled parts shown in Fig. 3; Fig. 5 is a vertical section showing the parts of Fig. 3 as attached upon material by the aid of a washer; and Fig. 6 represents a top view of the fastener and material seen in Fig. 5.

Similar letters of reference are employed to designate corresponding parts in the several figures of the drawings.

A represents a bird cage stud consisting of centrally united spring arms *a*, *a*, which are first bulged and then brought inwardly to a contracted point or groove, and then turned outwardly into a substantially flat flange or base. On their outwardly turned portions the spring arms *a* are at a suitably intermediate point deflected or bent out of their plane or out of the flat sufficiently to form ridges or ribs *a'*. By forming the ridges or ribs *a'* of the several spring arms at corresponding points, the said ridges or ribs taken together assume a substantially annular form and may be collectively referred to as a substantially annular ridge or rib. To coöperate with a spring bird cage formed substantially as just described, I provide a flanged eyelet B having a flange portion *b* with an extension *b'* which may be bent or turned over into holding engagement with the spring arms of the bird cage A and the annular ridge or rib thereof. The flange *b* of the fastening eyelet may be flat, but I prefer to construct it with a ridge or rib or depression *b²* corresponding to the annular ridge or rib *a'* of the bird cage spring arm, for the reason that excessive pressure which might accidentally be employed in the act of assembling the parts, would tend to flatten the offsets in the bird cage arms and impair the mutual holding engagement. By this construction when the parts are assembled as shown in Fig. 3 and pressure is brought to bear so as to turn the extension *b'* inwardly and downwardly upon the outwardly turned portion of the spring arms of the bird cage, the several parts become rigidly secured to each other and in such manner as to prevent any radial or inward and outward movement of the outwardly turned portion of the spring arms so that no collapse of the spring bird-cage is possible and at the same time any extra or specially provided or interior device to prevent collapse is dispensed with.

The above described parts may conveniently be assembled by passing the shank of the eyelet B through the material C and there clenched or upset at *d* below a washer D of suitable form.

What I claim and desire to secure by Letters Patent is:

A snap fastener stud member comprising a head composed of centrally united spring arms of substantially uniform width throughout their length, said arms forming the head and then extending outwardly to form a base, and each of said arms formed with an intermediate deflected portion, combined with an attaching part comprising a stem to be passed through the fabric, a flange located below said arms, and stamped with deflected portions to register with the deflected portions of said arms, and a bent over part engaging the upper sides of said arms, and holding the latter in intimate contact with said flange.

In testimony whereof, I have signed my name to this specification in the presence of two subscribing witnesses, on this eleventh day of August A. D., 1905.

GEORGE A. HOLMES.

Witnesses:
A. H. FLANNERY,
L. M. McKIE.